United States Patent [19]

Rinehart

[11] 4,020,049

[45] Apr. 26, 1977

[54] PROCESS FOR PREPARING POLYESTER RESIN

[75] Inventor: Verne R. Rinehart, Akron, Ohio

[73] Assignee: The Goodyear Tire & Rubber Company, Akron, Ohio

[22] Filed: Apr. 2, 1971

[21] Appl. No.: 130,743

Related U.S. Application Data

[63] Continuation-in-part of Ser. No. 667,854, Sept. 14, 1967, abandoned, which is a continuation-in-part of Ser. No. 254,754, Jan. 29, 1963, abandoned.

[52] U.S. Cl. .......................... 260/75 M; 260/475 P
[51] Int. Cl.² ........................................ C08G 63/22
[58] Field of Search ...................... 260/75 M, 475 P

[56] References Cited

UNITED STATES PATENTS

| | | | |
|---|---|---|---|
| 2,921,051 | 1/1960 | Amborski et al. | 260/75 R |
| 3,028,366 | 4/1962 | Engle et al. | 260/75 R |
| 3,050,533 | 8/1962 | Munro et al. | 260/346.1 |
| 3,427,287 | 2/1969 | Pengilly | 260/75 |

FOREIGN PATENTS OR APPLICATIONS

| | | | |
|---|---|---|---|
| 574,056 | 4/1959 | Canada | 260/75 R |
| 783,594 | 4/1968 | Canada | 260/75 R |
| 764,964 | 1/1957 | United Kingdom | 260/75 R |
| 778,410 | 7/1957 | United Kingdom | 260/75 R |
| 776,282 | 6/1975 | United Kingdom | |

*Primary Examiner*—Lucille M. Phynes
*Attorney, Agent, or Firm*—F. W. Brunner; J. M. Wallace, Jr.

[57] ABSTRACT

The invention is a process for reacting organic dicarboxylic acid and glycol under pressure and at elevated temperature in the presence of low molecular weight polyester resin to produce low molecular weight polyester resin product which can be polymerized to high molecular weight polyester resin. The process can be operated batchwise or continuously.

16 Claims, 1 Drawing Figure

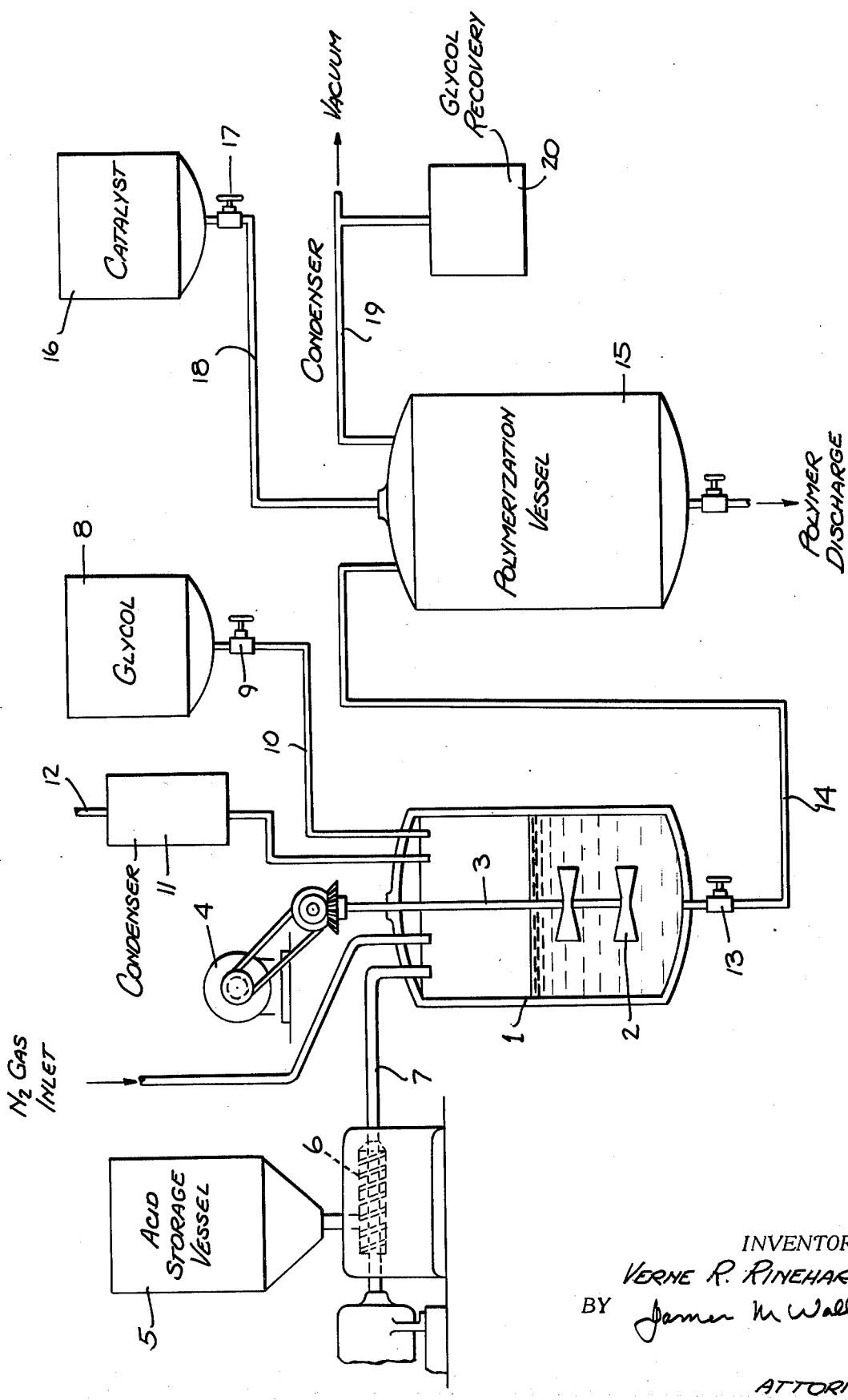

PROCESS FOR PREPARING POLYESTER RESIN

CROSS-REFERENCES

This application is a continuation-in-part of my application Ser. No. 667,854, filed Sept. 14, 1967, which in turn is a continuation-in-part of Ser. No. 254,754, filed Jan. 29, 1963, both now abandoned.

This invention relates to an improved process for preparing linear polyesters. More particularly, the invention relates to a process which can be operated as a batch process or a continuous process to produce high molecular weight linear polyesters of high quality.

High molecular weight linear polyesters are predominantly produced on a commercial scale by the ester interchange process. For example, in the production of higly polymeric linear polyethylene terephthalate the dimethyl esters of terephthalic acid are heated with an excess of ethylene glycol in the presence of an ester interchange catalyst at a temperature of about 185° to 250° C at atmospheric pressure until approximately the theoretical amount of methyl alcohol has been liberated. The excess glycol is then distilled off and the product remaining, which is the bis glycol ester, is polymerized by condensation reaction with the elimination of glycol by heating the bis glycol ester with a catalyst at elevated temperatures and under reduced pressures until a high molecular weight product is formed.

Polymeric ethylene terephthalate can be produced by heating terephthalic acid with ethylene glycol to form the diglycol ester which can then be polymerized by heating in the pressure of a catalyst under reduced pressures to form a high molecular weight product. This process, however, has not been successful on a commercial scale prior to this invention because the esterification of terephthalic acid with ethylene glycol requires extended times of heating at elevated temperatures and also requires the use of a large excess of glycol. It has been attempted to produced polyethylene terephthalate by reacting ethylene glycol with terephthalic acid under superatmospheric pressure at elevated temperatures but this process suffers from the disadvantages that a large excess of glycol is used and some of the glycol is converted into polyether glycol and other products. The polyether glycols become incorporated in the polymer molecules. Ether linkages in the polyester chain are known to lower softening point of the polyester resin and contribute to instability of high molecular weight linear polyethylene terephthalate.

Polymeric ethylene terephthalate can also be produced by heating terephthalic acid with ethylene glycol in the presence of lower molecular weight polyethylene terephthalate polyester at atmoshpeeric pressure. In this process only a limited concentration of ethylene glycol can be used. Thus if the concentration of ethylene glycol used in this process is too high, the maximum temperature attainable in the reaction mixture is too low to allow the reacton to proceed rapidly because of the cooling effect of the vaporizing glycol. The concentration of glycol is limited so that the temperature attainable in the mixture will be sufficiently high to support the reaction. However, at such a temperature glycol will vaporize from the mixture. When it is returned from the rectificatin column and drops into the mixture it flash distills, suddenly cooling and freezing a portion of the mixture, causing agitation difficulties and slow reaction rate. Production of a high molecular weight linear polyester from free acid and glycol using the above atmospheric process has heretofore not been attractive because of the slow reaction of the free acid with glycol and because of the difficulties in carrying out the process outlined above.

It is an object of the present invention to provide an improved process for producing linear polyesters. It is another object of the invention to provide a process for producing linear polyesters starting with free dicarboxylic acids and free glycol as reactants. It is another object to provide a practical process for commercial production of highly polymeric linear polyesters. Still another object of the invention is to provide a process in which only a minimum amount of catalyst is used and the high molecular weight linear polyester resin produced contains only a small amount of catalyst residue. It is another object of this invention to provide a process wherein the reacting materials are exposed to catalysts for a minimum period of time, thus minimizing undesirable side reactions. Other objects will appear hereinafter as the description of the invention proceeds.

According to the invention, linear polyesters are produced by reacting a free dicarboxylic acid with a glycol in a solvent which is a low molecular weight linear polyester at a pressure of from about 20 to about 1000 pounds per square inch gauge pressure to produce a low molecular weight linear polyester product having an average degree of polymerization of from about 1.4 to about 10. This low molecular weight polymer can then be polymerized by condensation reaction.

The present process can be advantageously operated as a continuous process by continuously adding free dicarboxylic acid and glycol to molten low molecular weight linear polyester resin, reacting them and continuously withdrawing an amount of low molecular weight polyester resin approximately equal to the acid and glycol added. High molecular weight linear polyesters can be produced continuously by continuously adding free dicarboxylic acid and glycol to molten low molecular weight linear polyester resin and reacting them while continously withdrawing low molecular weight resin and introducing the resin withdrawn into a polymerization apparatus and continuouslly polymerizing it to high molecular weight resin and withdrawing high molecular weight linear polyester resin from the polymerization apparatus.

The process of the invention is illustrated by the following examples.

EXAMPLE 1

Eight-hundred and fifty-four pounds of terephthalic acid, 98 pounds of isophthalic acid and 63 gallons of ethylene glycol were added to a reaction vessel containing 1900 pounds of molten low molecular weight 90/10 ethylene terephthalate-ethylene isophthalate copolyester having an average degree of polymerization of about 1.7. The vessel was sealed and pressurized to 50 pounds per square inch gauge pressure with nitrogen gas. The temperature of the mixture was raised to 260° C. Water vapor formed and was distilled out of the system at such a rate that the pressure in the system was maintained at about 50 pounds per square inch gauge pressure. After two hours of reaction time the mixture became clear, indicating that all of the phthalic acids had reacted.

EXAMPLE 2

The process as illustrated in Example 1 can be run continuously by adding the reactants continuously instead of by increments and continously removing low molecular weight polymer. This can be combined with a polymerization operation to provide an efficient, economical, continous process for the manufacture of high molecular weight polyester suitable for the production of fibers and films. This is illustrated below.

Referring to the drawing, an apparatus for continous operation of the process is shown. In operating continuously, to start the process, heated reaction vessel 1 is filled about one-third full with low molecular weight polyethylene terephthalate.

The reaction vessel is pressurized with nitrogen gas to a pressure of 30 to 100 pounds per square inch gauge pressure. Then this low molecular weight polymer is heated to a temperature of from 250° to 260° C. and agitated by means of stirrer 2 attached to shaft 3 which is turned by motor 4. A storage vessel 5 is used to store a supply of terephthalic acid. Terephthalic acid is conducted from storage vessel 5 by means of a screw conveyor 6 through conduit 7 into heated reaction vessel 1. A storage vessel 8 is used to hold ethylene glycol. Ethylene glycol is conducted from the storage vessel by means of control valve 9 through conduit 10 into heated reaction vessel 1. The terephthalic acid and ethylene glycol are run in continuously and simultaneously in approximately stoichiometric proportions to produce low polymer having the desired degree of polymerization. Water released in the esterification reaction is vaporized. water vapor together with ethylene glycol vapors pass into reflux condenser 11 where the ethylene glycol is condensed and returned to the reaction vessel 1. Water vapor is drawn off through line 12 at the top of condenser 11 at such a rate as to maintain the pressure in the system. Lower molecular weight polyester is formed and is withdrawn from heated reaction vessel 1 at about the same rate that the reactants are introduced into heated reaction vessel 1 by means of control valve 13 through conduit 14 and conducted to polymerization vessel 15 in which the low molecular weight polyester resin is passed in at one end, polymerized while passing through the reactor and the high molecular weight resin formed is removed from the other end. Polymerizaton catalyst, stored in storage vessel 16, is continuously conducted through cohtrol valve 17 through conduit 18 into polymerization vessel 15. Water vapor and glycol released in the polymerization reaction are withdrawn from the polymerization vessel through condenser 19 and passed to glycol recovery unit 20 where the glycol is recovered. The polymerization vessel is operated under reduced pressure produced by a vacuum system, not shown, which is connected to condenser 19. High molecular weight polyester resin is removed from the polymerization reaction vessel through valve 21 and conduit 22 and sent to another station not shown where it may be stored or processed into fiber, film, or other products.

EXAMPLE 3

Preparation of Heel

About 100 pounds of a preformed polymer having an average degree of polymerization of about 75, was added to the reactor. The reactor was pressurized with oxygen-free nitrogen to 70 pounds/sq. in. gauge. Then 771 pounds of ethylene glycol were charged into the reactor and mixed with the preformed polymer. Stabilizer, catalyst and ether inhibitors were added. The mixture was heated to 450° F. 300 pounds of purified terephthalic acid were charged into the reactor. The mixture was heated until it attained 460° F. An additional 500 pound of terephthalic acid were added and the mixture reheated to 460° F. 500 pounds more of terephthalic acid were added and the mixture reheated to 460° F. An additional 390 pounds of terephthalic acid were added and the mixture heated and reacted until the mixture clarifed, which occurred at about 500° F. This procedure took about three hours.

Stage 1 Reaction

A charge of 1470 pounds of terephthalic acid and 660 pounds of ethylene glycol were added to the heel and mixed. The temperature of the mixture fell to 460° F during mixing and the over a period of one hour and fifty minutes and the temperature was raised to 540° F. The batch was then discharged. During this cycle the pressure was initially 70 psig and was maintained for one hour. The pressure was then reduced over a period of thirty minutes to 20 psig, and maintained at this pressure for the remainder of the reaction.

State 2 Reaction

Titanium dioxide pigment (0.25%), optical brightener, catalyst and about one-half of the polymer made by the above procedure were added to the reactor. Then the pressure was slowly reduced from atmospheric to a final vacuum of less than 20 millimeters of mercury over a period of 45 minutes. The temperature of the mixture at the start of mixing was 522° F and this was raised to 550° F over a period of 45 minutes. The temperature was maintained in the range of from 550° to 560° F for 1¼ hours, and then the mixture was transferred to the Stage 3 Reactor.

State 3 Reaction

The pressure in the reactor was reduced to 0.5 millimeters of mercury and the temperature of the mixture raised to 555° F. The mixture was maintained under these conditions for one hour twenty minutes while being mixed with a spiral type agitator and then discharged from the reactor.

Polymer Properties

The properties of the polymer were:
1. Intrinsic viscosity — 0.62
2. Melting point — 265° C (DTA)
3. Color — b value of −3 (Gardener color difference meter)
4. Carboxyl content — 25 (equilvalents per million grams)
5. Ether content — 1.5% by weight In the embodiment of Example 3, this invention is primarily illustrated by the State 1 Reaction. The procedures for Preparation of Heel, Stage 2 Reaction, and State 3 Reaction, may be carried out by techniques well-known in the art.

The invention has been illustrated particularly with respect to the use of terephthalic acid and ethylene glycol as reactants. It can also be used to prepare polyesters from other acids and other glycols. For example, instead of terephthalic acid, other acids can be used.

Thus, the invention is applicable to the preparaton of polyesters and copolyesters of various dicarboxylic acids and various glycols. Representative examples of acids which can be used are aromatic discarboxylic acids such as isophthalic acid, orthophthalic acid, p,p'-diphenyl dicarboxylic acid and 2,6 napthalic acid; cycloaliphatic dicarboxylic acids such as hexahydroterephthalic acid; and aliphatic dicarboxylic acids such as succinic acid, adipic acid, sebacic acid, etc. Polyesters of other glycols can also be similarly prepared. Representative examples of such glycols are the polymethylene glycols having from 2 to 10 methylene groups such as ethylene glycol, proplylene glycol, tetramethylene glycol, hexamethylene glycol, and decamethylene glycol, the cyclohexane diols, cyclohexane dimethanol, di-beta-hydroxy ethoxy benzene, and 2,2-bis[4(beta hydroxyethoxy)phenyl]propane and similar varieties of glycols. The invention can be used to prepare copolyesters by reacting one or more acids with one or more glycols.

The invention is especially suitable for the preparation of copolyesters of terephthalic acid such as the ethylene terephthalate-ethylene isophthalate copolyesters containing terephthalic acid as a major portion of the acid component such as the 90/10, 80/20, 70/30 and 60/40 copolyester, i.e., these copolyesters containing from 90 to 60 mol percent of terephthalic acid based on the total acid component and from 10 to 40 mol percent of isophthalic acid based on the total acid component.

The process can be operated over a wide range of temperatures. The temperature used for the esterification reaction should be at least as high as the melting temperature of the low molecular weight polyester resin used but should not be so high that a large amount of degradation occurs with a resultant decrease in desirable properties. Thus the temperature can be suitably from about 150° to 300° C., depending on the melting temperature of the low polymer used, and is preferably operated in the range of from 220° to 260° C. The ratio of the mols of glycol to the mols of dicarboxylic acid used will be in the range of from about 1.7:1 to 1.05:1 (wich corresponds to a degree of polymerization of the final product from about 1.4 to 20). When terephthalic acid is used as a reactant and the process is operated at about 250° C. the ratio of glycol to terephthalic acid can be any ratio in the above mentioned range and satisfactory results obtained.

The pressure used for the esterificatin reaction will vary with the temperature used and generally will be at least as high as the vapor pressure of the most volatile glycol in the reaction mixture at the temperature used. The pressure used will be less than the vapor pressure of water at the temperature at which the reaction is occurring. Thus the pressure can suitably be from about 20 to about 1000 pounds per square inch gauge pressure and is preferably operated in the range of from 30 to 100 pounds per square inch gauge pressure.

A feature of the present invention is the use of the low molecular weight polymer as a solvent for the reaction of the acid and the glycol. A sufficient amount of low molecular weight polymer must be used to provided solvent for at least a portion of the acid. The amount of low polymer used will generally be more than 10 percent of the total reactor charge which includes acid and glycol as well as the low polymer. The reactor will not ordinarily be completely filled with the low molecular weight polymer and the glycol and acid added. Usually the reactor will have a free board space of 10 percent or more, although in some instances, as in continuous operation in certain types of apparatus, the reactor can be substantially completely filled with reactants and low molecular weight polymer, if desired.

In operating the process batchwise the weight ratio of low molecular weight polymer to batch (acid and glycol added) will be in the range of from about 30/70 to 60/40. A ratio of 50/50 will generally be used. In certain continuous operations the ratio cn be as high as 98/2 or higher.

The process can be carried out by charging the reaction vessel with the mixture of glycol and acid together with the low molecular weight polyester resin and heating the mixture until the low molecular weight resin melts and reacting the material. However, it is preferred to operate the process by first melting the low molecular resin ahd then passing in the acid and glycol and reacting them. The process can be operated as a batch process or as a continous process. For efficiency and economy of operation it is preferred to operate it as a continuous process.

The low molecular weight linear polyester initially used as the solvent is a linear polyester having an average degree of polymerization in the range of from about 1.4 to about 10. It can have the same degree of polymerization as the final product or it can have a different degree of polymerizaion — that is — it can have a higher or lower degree of polymerization because the degree of polymerization of the final product is regulated by the amounts and ratios of acid to glycol added to the system. The low molecular weight linear polyester initially used as the solvent will usually be composed of units derived from the same kind of acid and glycol that are reacted in admixture with the low molecular weight polyester. However if desired, it can be composed of units derived from acids and/or glycols that are different from those being reacted in admixture with it.

The average degree of polymerization for both initial low molecular weight polyester and the low molecular weight product produced is in the range of from 1.4 to 10 and preferably from 1.6 to 5. The polyester molecules have the general structure

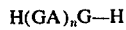

H(GA)$_n$G—H wherein H is hydrogen; G is a glycol unit or residue; A is a dicarboxylic acid unit or residue, and n is a number from 1.4 to 10. Thus, the low molecular weight polyester resin has a number average molecular weight of from about 300 to about 2000. When this resin is polymerized either by batch process or continuous process in the presence of a polymerization catalyst to form a high polymer, the product is a highly polymeric polyester resin having an intrinsic viscosity of at least 0.40, generally in the range of from 0.50 to 1.20.

The initial low molecular weight linear polyester can be prepared by polymerizing the bis glycol ester, or by any other suitable method.

It was shown above that the invention provides an efficient continous process for the production of high molecular weight linear polyester resin, i.e., resin having an intrinsic viscosity of at least 0.40, generally above 0.50. The procedure and conditions for the preparation of the low molecular weight resin produced in the first stage are illustrated above. The condensaton or polymerization reaction for the preparation of the high molecular weight resin from the low molecular weight resin is carried out at elevated temperature under reduced pressure in the presence of a suitable polymerizaton catalyst in accordance with the usual known techniques. Thus, the reaction is preferably carried out in the absence of oxygen, generally in an atmosphere of an inert gas such as nitrogen or the like. It is carried out under reduced pressure, generally below 10 millimeters of mercury pressure and usually at or below 1 millimeter of mercury pressure at a temperature in the range of from 260° to 290° C., although other pressures and temperatures can be used, according to known practice.

The process of the present invention has many advantages, both technical and economical. The free acids are less expensive than dialkyl estes of acids so considerable savings can be made by using the free acid where the prior art processes use the dialkyl esters. There is no by-product of lower alkyl alcohol and since the excess of glycol used in kept at a minimum, recovery and losses of glycol are considerably reduced. Reaction rates are rapid and complete reaction from raw material to high polymer may be carried out in as little as three hours. Furthermore, polyesters formed by this method have intrinsic viscosities which are somewhat higher than those normally obtained by the ester interchange route. In addition to these advantages, the polyester product may contain much less catalyst residue than polyester resin formed by the ester interchange process. No catalyst is needed in the initial esterification reaction although catalyst such as zinc acetate, manganous acetate, and alkali metal alcoholates may be employed if desired. The only catalyst actually necessary is a polymerization or condensation catalyst which may suitably be a material such as antimony trioxide, zinc borate, lithargo, lead acetate, magnesium oxide, or other condensation catalyst.

While certain representative embodiments and details have been shown for the purpose of illustrating the invention it will be apparent to those skilled in the art that various changes and modifications may be made therein without departing from the spirit or scope of the invention.

What I claim is:

1. The method for the commercial scale production of polyesters which comprises adding commercial scale quantities of ethylene glycol and a free aromatic dicarboxylic acid in the molar ratio of glycol to acid of from 1.7:1 to 1.05:1 to a solvent consisting of a preformed low molecular weight linear condensation polyester of a glycol and a dicarboxylic acid, said polyester having an average degree of polymerization of from 1.4 to 10, heating and reacting the mixture at a temperature above the melting temperature of the low molecular weight linear polyester at a pressure of from about 20 to about 1000 pounds per square inch gauge pressure until a linear condensation polyester resin of said glycol and acid having an average degree of polymerization of from 1.4 to 10 is formed.

2. The process of claim 1 in which the water formed in the esterification reaction is distilled out of the mixture at such a rate that the pressure is maintained within the range of from about 20 to about 1000 pounds per square inch gauge pressure.

3. The method for the commercial scale production of a low molecular weight ethylene glycol-terephthalate polyester which comprises adding commercial scale quantities of ethylene glycol and terephthalic acid in the ratio of from 1.7:1 to 1.05:1 of ethylene glycol to terephthalic acid to a solvent consisting of low molecular weight ethylene glycol-terephthalate polyester having an average degree of polymerization of from 1.4 to 10, heating and reacting the mixture at a temperature above the melting temperature of the low molecular weight ethylene glycol-terephthalate polyester at a pressure range of from about 20 to about 1000 pounds per square inch gauge pressure.

4. The method for the commercial scale production of polyesters which comprises continuously adding commercial scale quantities of ethylene glycol and terephthalic acid in the ratio of from 1.7:1 to 1.05:1 of ethylene glycol to terephthalic acid to a solvent consisting of low molecular weight ethylene glycol-terephthalate polyester having an average degree of polymerization of from 1.4 to 10 while heating and reacting the mixture at a temperature above the melting temperature of the low molecular weight ethylene glycol-terephthalate polyester at a pressure range of from about 20 to about 1000 pounds per square inch gauge pressure, continuously venting the water vapor formed in the reaction at such a rate that the pressure in the system is maintained constant within said pressure range and continuously withdrawing an amount of low molecular weight ethylene glycol-terephthalate polyester about equal to the amount of ethylene glycol and terephthalic acid added.

5. The method of claim 4 in which a condensation polymerization catalyst is added to the portion of low molecular weight polyester withdrawn and the low molecular weight polyester is polymerized to a high molecular weight polyester by condensation.

6. The method for the commercial scale production of a highly polymeric linear polyester which comprises adding commercial scale quantities of (A) at least one acid selected from the group consisting of terephthalic acid, isophthalic acid and 2,6-naphthalic acid and (B) ethylene glycol in the molar ratio of glycol to acid of from 1.7:1 to 1.05:1 to a solvent consisting of a low molecular weight linear condensation polyester of a dicarboxylic acid of (A) and ethylene glycol, heating and reacting the mixture in the range of from the melting temperature of the low molecular weight linear polyester to 300° C at a pressure of from about 20 to about 1000 pounds per square inch gauge pressure distilling out the water formed in the reaction at such a rate that the pressure in the system remains constant within said pressure range, adding a condensation polymerization catalyst and then heating and reacting the mixture at a temperature of from about 265° C to 280° C at a pressure of about one millimeter of mercury until a high molecular weight linear polyester is formed.

7. The method for the commercial scale production of a linear polyester which comprises adding commercial scale quantities of (A) at least one acid selected from the group consisting of terephthalic acid, isophthalic acid and 2,6-naphthalic acid and (B) ethylene glycol in the molar ratio of glycol to acid of from 1.7:1 to 1.05:1 to a solvent consisting of a low molecular weight linear condensation polyester of a dicarboxylic acid of (A) and ethylene glycol, heating and reacting the mixture in the range of from the melting temperature of the low molecular weight linear polyester to 300° C at a pressure of from about 20 to about 1000 pounds per square inch gauge pressure.

8. The method of claim 7 wherein said pressure is from 20 to about 100 pounds per square inch gauge.

9. The method of claim 4 wherein said water vapor formed from said reaction carries with it and forms a mixture with ethylene glycol, said water vapor-ethylene glycol mixture is passed through a condenser to condense ethylene glycol, and said ethylene glycol is returned to the reacting mixture.

10. The method of claim 3 wherein said pressure is from about 20 to about 100 pounds per square inch gauge.

11. The method of claim 3 comprising adding said ethylene glycol and terephthalic acid to said low molecular weight ethylene glycol-terephthalate polyester while said polyester is in a molten condition.

12. The method of claim 4 comprising adding said ethylene glycol and terephthalic acid to said low molecular weight ethylene-terephthalate polyester while said polyester is in a molten condition.

13. The method of claim 3 wherein the amount of solvent consisting of said ethylene glycol-terephthalate polyester is greater than the amount of said ethylene glycol and terephthalic acid.

14. The method of claim 7 wherein the amount of solvent consisting of a low molecular weight polyester is about 55% by weight based on the weight of said polyester, ethylene glycol and acid.

15. The method of claim 3 wherein said degree of polymerization is about 1.6 to 5.

16. The method of claim 4 wherein the pressure is at least as high as the vapor pressure of the glycol in the reaction mixture at the temperature used and less than the vapor pressure of water at the reaction temperature.

* * * * *